(12) United States Patent
Sato

(10) Patent No.: US 11,046,261 B2
(45) Date of Patent: Jun. 29, 2021

(54) VEHICLE INTERIOR COMPONENT AND METHOD OF INSTALLING ELECTRIC COMPONENT IN VEHICLE

(71) Applicant: TOYOTA BOSHOKU KABUSHIKI KAISHA, Aichi (JP)

(72) Inventor: Kosuke Sato, Aichi-ken (JP)

(73) Assignee: TOYOTA BOSHOKU KABUSHIKI KAISHA, Aichi (JP)

(*) Notice: Subject to any disclaimer, the term of this patent is extended or adjusted under 35 U.S.C. 154(b) by 381 days.

(21) Appl. No.: 16/029,257

(22) Filed: Jul. 6, 2018

(65) Prior Publication Data
US 2019/0031121 A1     Jan. 31, 2019

(30) Foreign Application Priority Data
Jul. 25, 2017   (JP) .............................. JP2017-143379

(51) Int. Cl.
  *B60R 16/02*        (2006.01)
  *B62D 65/14*        (2006.01)

(52) U.S. Cl.
  CPC .......... *B60R 16/0215* (2013.01); *B62D 65/14* (2013.01)

(58) Field of Classification Search
  CPC ........................... B60R 16/0215; B62D 65/14
  USPC ........................................ 29/854, 825, 592.1
  See application file for complete search history.

(56) References Cited

U.S. PATENT DOCUMENTS 5,465,200 A * 11/1995 Finocchio ............ B60Q 1/2615
                                                    362/368

FOREIGN PATENT DOCUMENTS

JP       2015-020472           2/2015
JP       2015020472 A    *    2/2015

* cited by examiner

*Primary Examiner* — Peter Dungba Vo
*Assistant Examiner* — Azm A Parvez
(74) *Attorney, Agent, or Firm* — Greenblum & Bernstein, P.L.C.

(57) ABSTRACT

A vehicle interior component includes: a body including a through hole, a first surface opposed to a vehicle body panel, and a second surface opposite from the first surface; and a wire holder holding an end section of an electric wire connected with a wire-side connector. The wire holder includes: a base section extending from a first section of a hole edge of the through hole toward an inner side of the through hole and having resilience; a free end section including an end surface opposed to a second section of the hole edge; and a meddle section. The base section, the free end section, the middle section, and the first section define a space with a dimension greater than a diameter of the end section and less than the wire-side connector to hold the end section in the space and the wire-side connector closer to the second surface.

10 Claims, 8 Drawing Sheets

VEHICLE INTERIOR COMPONENT AND METHOD OF INSTALLING ELECTRIC COMPONENT IN VEHICLE

CROSS REFERENCE TO RELATED APPLICATION

This application claims priority from Japanese Patent Application No. 2017-143379 filed on Jul. 25, 2017. The entire contents of the priority application are incorporated herein by reference.

TECHNICAL FIELD

The present disclosure relates to a vehicle interior component and a method of installing an electric component in a vehicle.

BACKGROUND

An example of wire harness holding component at a roof lining is a bracket having an elongated shape that extends along an opening edge of a hole that is formed in the roof lining, The bracket include a holder to hole a wire harness.

The bracket that includes the holder for holding the wire harness is prepared separately from the roof lining, that is, a component separate from the roof lining is required for holding the wire harness. In the technical field related to interior components for vehicles, there is a strong demand for a reduction in the number of parts. Therefore, a technology for reducing the number of parts for attaching electric components to interior components of vehicles is expected.

If the bracket is simply omitted, the wire harness may not be held at a proper position during fixing of the roof lining to a vehicle roof and the wire harness may not be at a position to provide an easy access of the wire harness for an assembly person to connect the wire harness to an electric component after the roof lining is fixed to the vehicle roof.

SUMMARY

The present invention was made in view of the foregoing circumstances. An object is to provide a vehicle interior component that includes a wire holder to temporarily hold an electric wire to be connected to an electric component during fixing of the vehicle interior component to a vehicle body panel without extra parts and a method of installing the electric component in the vehicle.

A vehicle interior component includes a body and a wire holder. The body includes an interior wall of a vehicle and a through hole for passing an electric component including a component-side connector to fix the electric component to a vehicle body panel. The body includes a first surface opposed to the vehicle body panel and a second surface opposite from the first surface. The wire holder is for temporarily holding an end section of at least one electric wire during fixing of the vehicle interior component to the vehicle body panel wherein the end section of the at least one electric wire is connected with a wire-side connector. The wire holder includes a base section, a free end section, and a middle section. The base section extends from a first section of a hole edge of the through hole toward an inner side of the through hole and has resilience. The free end section includes an end surface opposed to a second section of the hole edge. The middle section is between the base section and the free end section. At least the base section, the free end section, the middle section, and the first section of the hole edge define a space having at least one dimension greater than a diameter of the end section of the electric wire and less than the wire-side connector to hold the end section of the electric wire in the space and the wire-side connector closer to the second surface of the vehicle interior component than the first surface of the vehicle interior component during the fixing of the vehicle interior component to the vehicle body panel.

According to the configuration, the end section of the electric wire is held by the wire holder and the wire-side connector is held in the interior of the vehicle rather than a space between the vehicle body panel and the vehicle interior component. Namely, the end section of the electric wire is hooked to the wire holder prior to the fixing of the vehicle interior component to the vehicle body panel and temporarily held by the wire holder during the fixing of the vehicle interior component to the vehicle body panel. During the fixing of the vehicle interior component to the vehicle body panel before attachment of the electric component to the vehicle interior component, the end section of the electric wire and the wire-side connector may be displaced to unexpected positions. Because the end section of the electric wire is held at a proper position with the wire holder and thus the wire-side connector can be held at a proper position. Because the base section of the wire holder has resilience, the wire holder rotates about a rotation axis at the base section to a position out of the way of the electric component when the wire-side connector is connected with the component-side connector and the wire holder is pushed by the electric component during insertion of the electric component into the space between the vehicle body panel and the vehicle interior component via the through hole. Because the wire holder is a portion of the vehicle interior component integrally formed with the body, extra parts is required for holding the electric wire and thus the number of parts for vehicle interior component can be reduced.

According to the technologies described herein, the number of parts related to the vehicle interior component can be reduced and the displacement of the end section of the electric wire or the wire-side connector is less likely to occur during the fixing of the vehicle interior component to the vehicle body panel.

DETAILED DESCRIPTION

Figure 1:
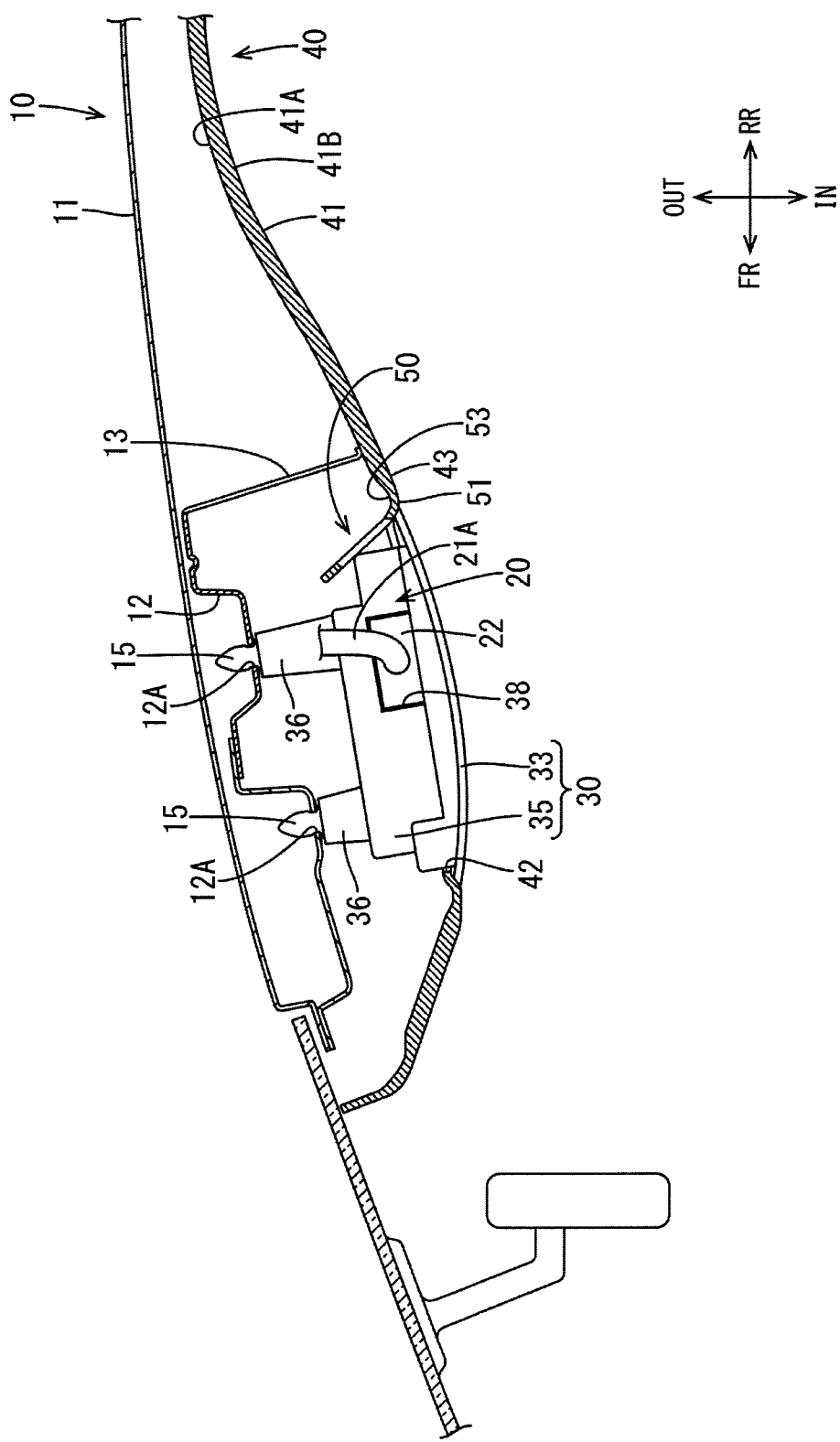
FIG. 1 is a cross-sectional view illustrating a ceiling interior component and a lighting unit fixed to a roof panel of a vehicle according to an embodiment.

An embodiment will be described with reference to FIGS. 1 to 8. Arrows are present in the drawings. FR and RR indicate the front side and the rear side of the vehicle, respectively. IN and OUT indicate the interior side of the vehicle and the exterior side of the vehicle, respectively. L and R indicate the right side and the left side of the vehicle, respectively.

As illustrated in FIG. 1, a vehicle roof 10 includes a roof panel 11 (a vehicle body panel) and a ceiling interior component 40 (a vehicle interior component). The roof panel 11 forms a ceiling exterior component made of metal. The ceiling interior component 40 is disposed on the interior side of the vehicle relative to the roof panel 11. The ceiling interior component 40 includes a first surface 41A opposed to the roof panel 11 and a second surface 41B opposite from the first surface 41A. The roof panel 11 includes a mounting portion 12 to which a lighting unit 30 (an electric component) is fixed. The lighting unit 30 is connected to a wire harness 20 and attached to the ceiling interior component 40.

The mounting portion 12 is formed from a metal plate member that extends along a panel surface of the roof panel 11 as illustrated in FIG. 1. The mounting portion 12 includes mounting holes 12A in which clips 15 are inserted, respectively, for fixing the lighting unit 30 to the roof panel 11. The roof panel 11 includes supports that support the ceiling interior component 40 from the exterior side of the vehicle. The supports are located at the rear of the mounting portion 12 and an outer side of the mounting portion 12 with respect to the width direction of the vehicle. One of the supports at the rear of the mounting portion 12 indicated by numeral 13 is illustrated in FIG. 1.

As illustrated in FIG. 1, the support 13 projects from the mounting portion 12 toward the ceiling interior component 40 and includes a distal end that bends along the first surface 41A of the ceiling interior component 40 facing the roof panel 11. The support 13 supports a section of the ceiling interior component 40 around a through hole 42 from the exterior side of the vehicle. With the support 13, the section of the ceiling interior component 40 around an hole edge 43 of the through hole 42 can be held steady without a bracket to reinforce the hole edge 43.

Figure 5:
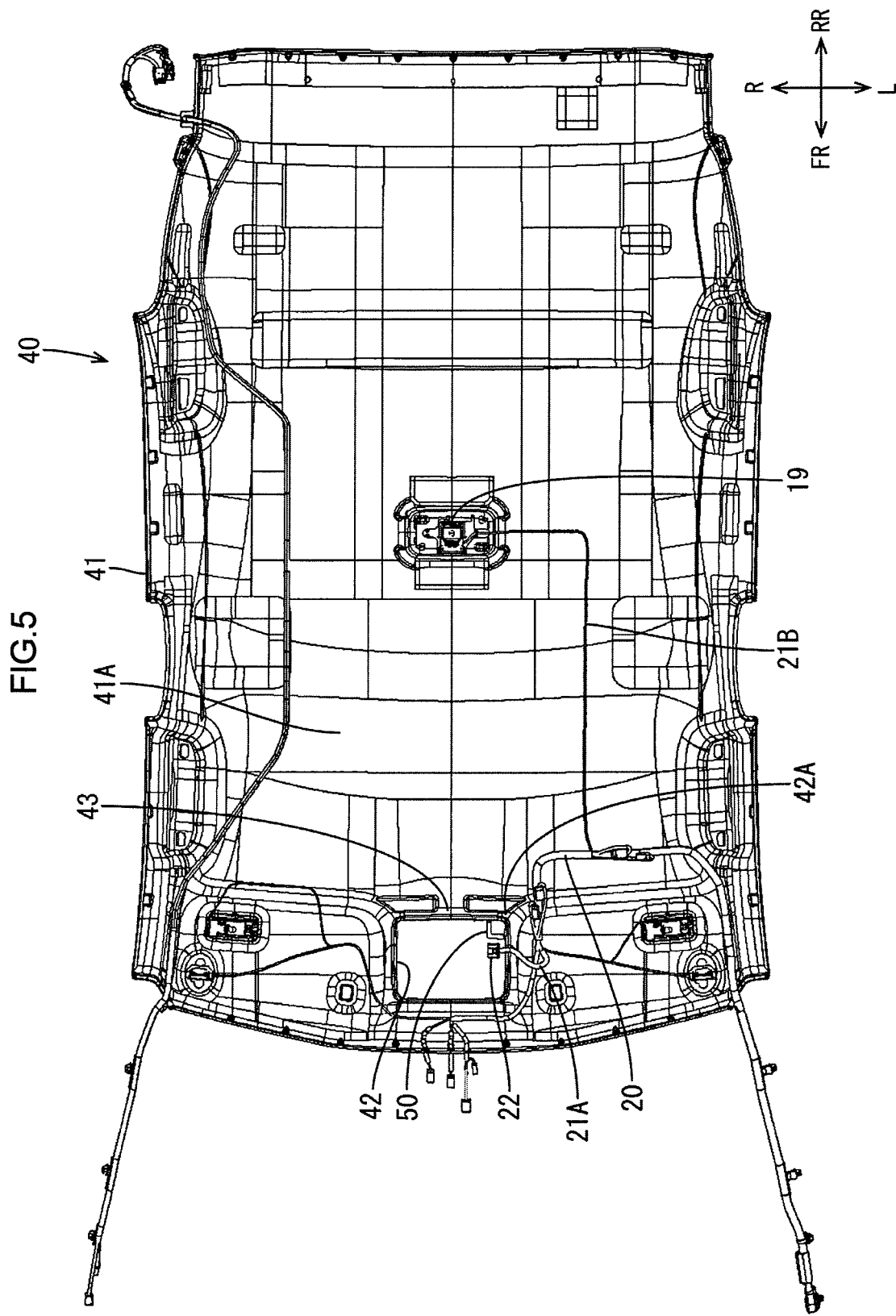
FIG. 5 is a plan view of the exterior side of the ceiling interior component.

As illustrated in FIG. 5, the wire harness 20 includes at least one electric wire 21A that is to be connected to the lighting unit 30. The wire harness 20 includes electric wires that are sheathed with insulating members and bundled. The wires include an electric wire 21B that is to be connected to a room lamp. The wire harness 20 is routed in a predefined pattern on the first surface 41A of the ceiling interior component 40 on the exterior side of the vehicle along a front pillar to the outside of the ceiling interior component 40.

The electric wire 21A is fixed to the first surface 41A of the ceiling interior component 40 with adhesive tapes at predefined points in the pattern. The electric wire 21A has a length corresponding to a sum of a distance between the predefined point at which the electric wire 21A is fixed to the first surface 41A of the ceiling interior component 40 and a connecting portion at which the electric wire 21A is connected with the lighting unit 30 that is fixed to the roof panel 11 (a component-side connector 38) and a margin required for connecting a wire-side connector 22 with the component-side connector 38. The margin provides flexibility for the electric wire 21A when the lighting unit 30 is mounted (see FIG. 4).

Figure 6:
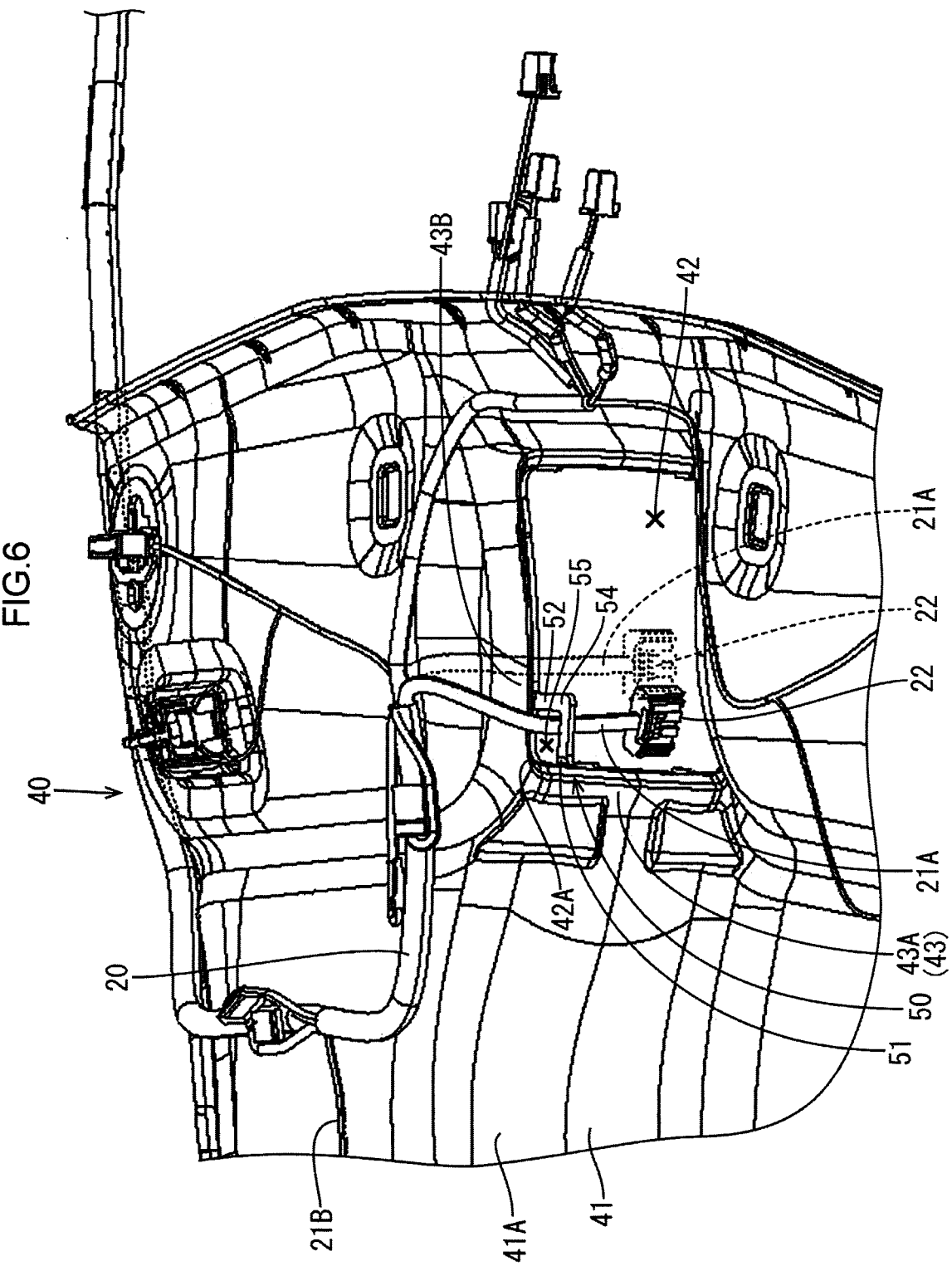
FIG. 6 is a perspective view illustrating an electric wire held by a temporary wire holder.

As illustrated in FIG. 6, the wire harness 20 includes the wire-side connector 22 at the end section of the electric wire 21A. The wire-side connector 22 having a block-like overall shape is a male connector to be inserted into the component-side connector 38 of the lighting unit 30, which will be described later (see FIG. 2). The wire-side connector 22 is to be electrically connected to the component-side connector 38 and fixed to the component-side connector 38.

Figure 3:
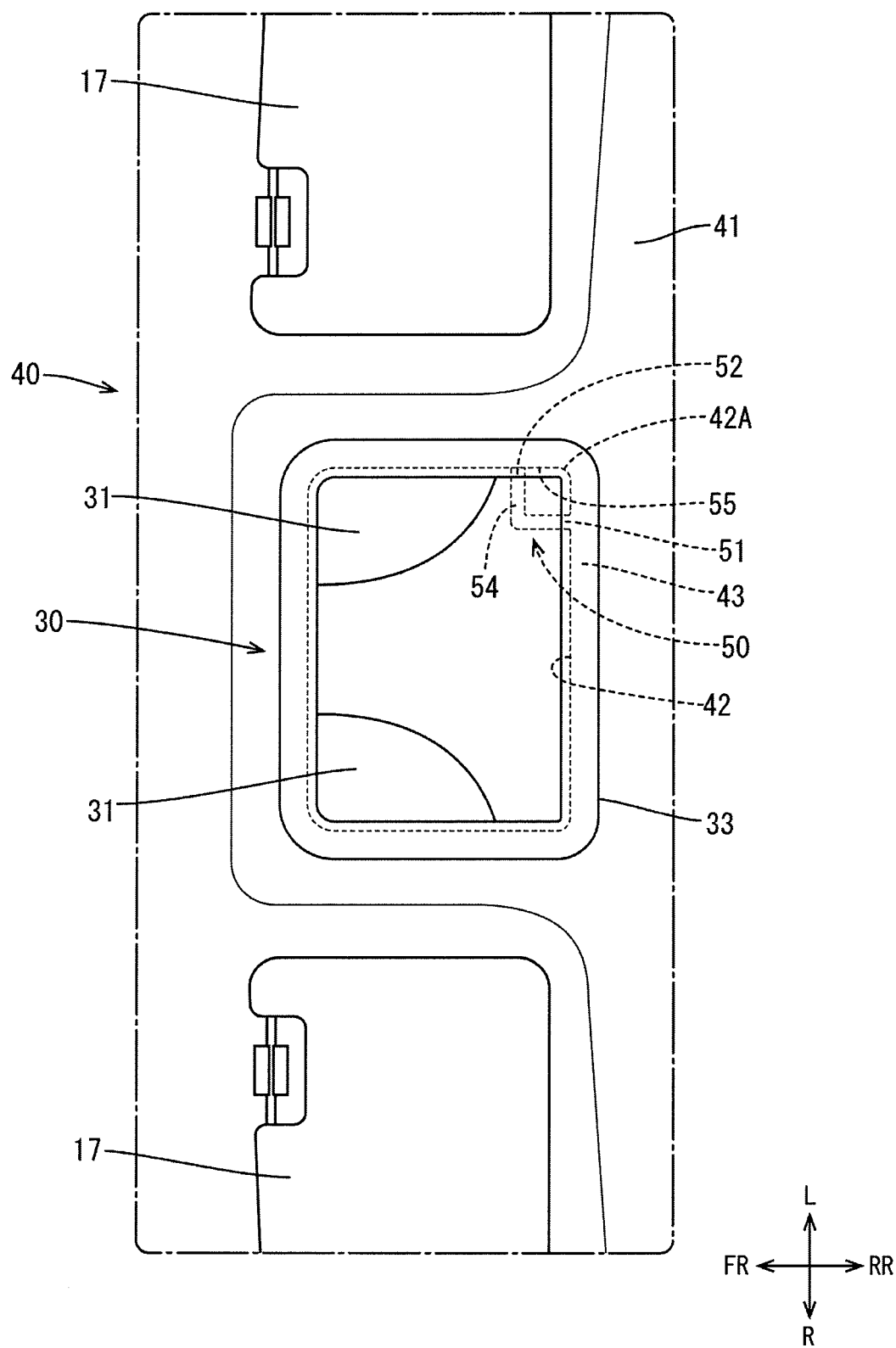
FIG. 3 is a plan view of the lighting unit viewed from under in the interior of the vehicle.
Figure 4:
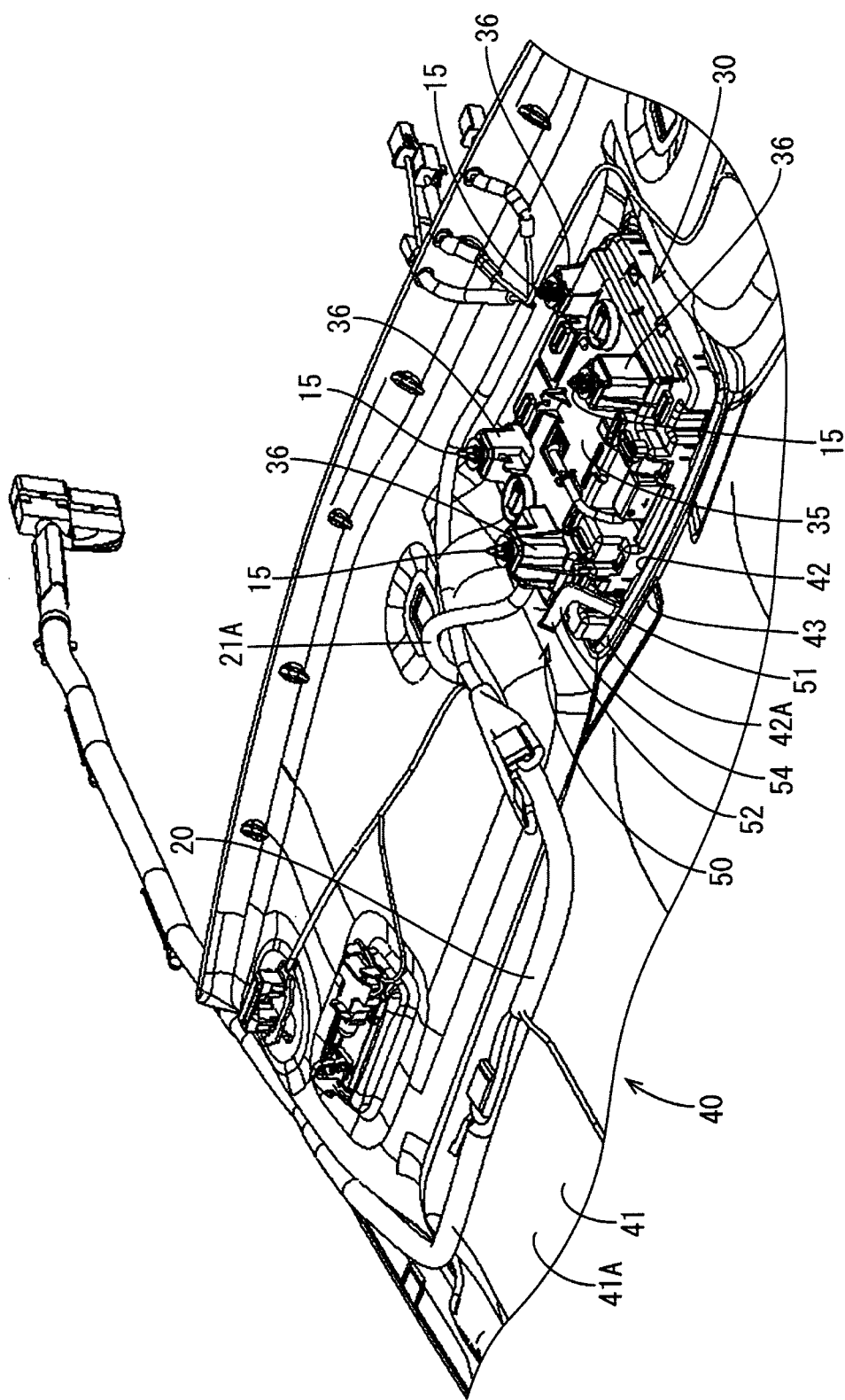
FIG. 4 is a perspective view of the lighting unit viewed from above outside the interior of the vehicle.

As illustrated in FIG. 3, the lighting unit 30 is to be attached to a section of the ceiling interior component 40 closer to the front side of the vehicle and at the middle of the of the vehicle with respect to the width direction of the vehicle. On the right side and the left side relative to the lighting unit 30, a driver-side sun visor 17 and a passenger-side sun visor 17 are disposed. The lighting unit 30 has a rectangular two-dimensional shape and includes two map lamps 31 at front corners, respectively. Sections of the map lamps 31 on interior sides are covered with covers having light transmissivity. The map lamps 31 are configured to emit light toward a driver's sheet and a passenger's sheet, respectively through the covers when the map lamps 31 are turned on via switches.

Figure 2:
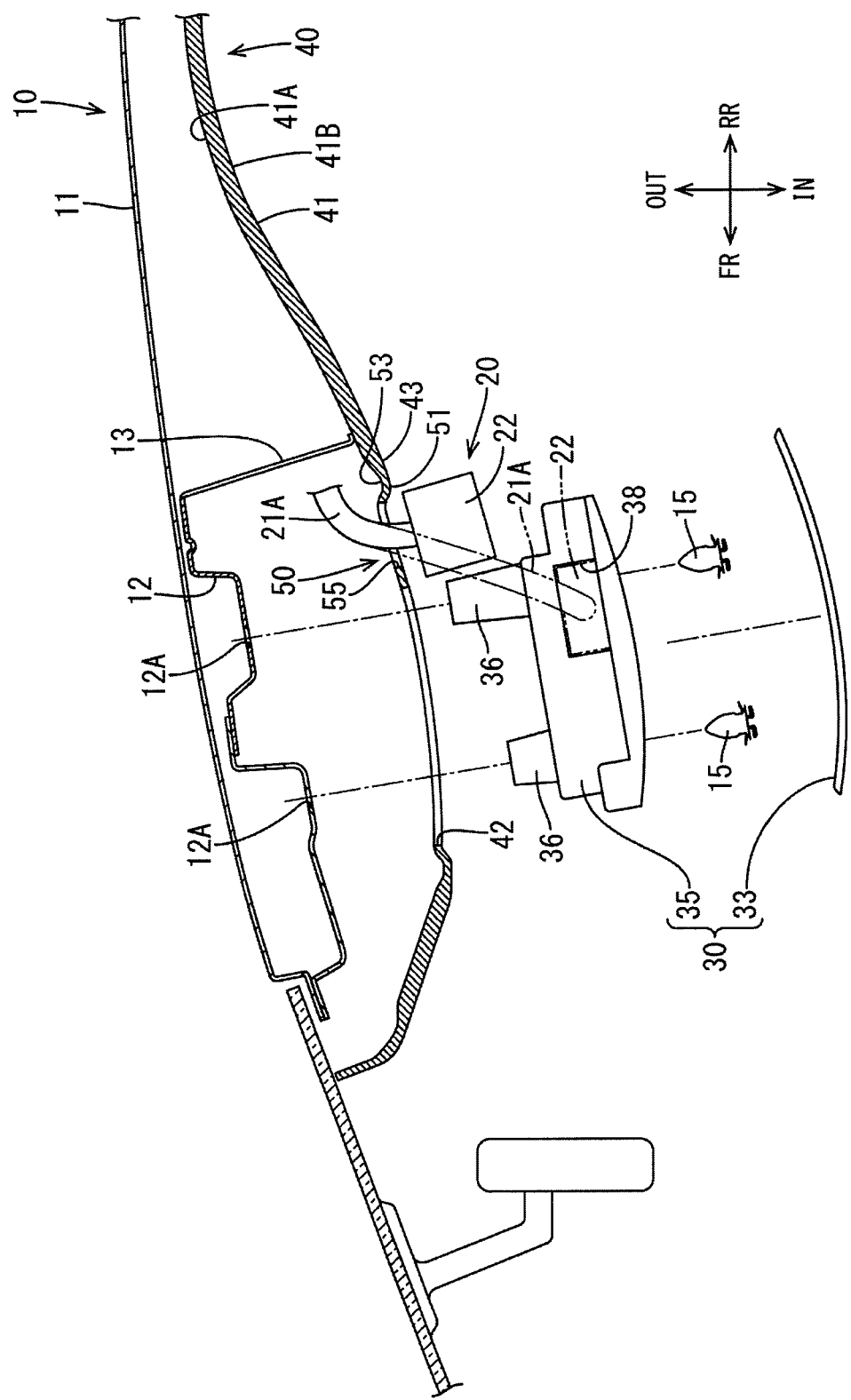
FIG. 2 is an exploded view of FIG. 1.

As illustrated in FIGS. 1 and 2, the lighting unit 30 includes the component-side connector 38 with which the wire-side connector 22 is to be connected. The component-side connector 38 including an opening on the left side is a female connector to which the wire-side connector 22 is to be inserted from the left side. The lighting unit 30 is configured to receive power and electrical signals for turning on the map lamps 31 via the wire harness 20 and the component-side connector 38 and the wire-side connector 22 that are electrically connected to each other.

As illustrated in FIGS. 1 and 2, the lighting unit 30 includes a first case 33 located on the interior side and a second case 35 located on the exterior side. The first case 33 and the second case 35 are assembled together. The second case 35 is a box-shaped component disposed on the exterior side relative to the ceiling interior component 40. The first case 33 is a plate-shaped component disposed to cover an opening of the second case 35 from the interior of the vehicle. The lighting unit 30 includes mounting bases 36 that protrude from the second case 35 toward the exterior side. The lighting unit 30 is fixed to the mounting portion 12 with the clips 15 attached to the mounting bases 36. The lighting unit 30 may be fixed to the mounting portion 12 with other types of fixing members such as screws.

The ceiling interior component 40 includes an urethane foam sheet as a base. A skin is attached to a first surface of the ceiling interior component 40 on the interior side. The skin may be a fabric sheet, a no-woven fabric sheet, a resin sheet, or any other type of sheet. An airflow stop layer is formed on the first surface 41A of the ceiling interior component 40 on the exterior side. The ceiling interior component 40 includes layers that are laminated and is formed in a predefined shape through hot pressing.

As illustrated in FIG. 5, the ceiling interior component 40 includes a body 41 and a temporary wire holder 50. The body 41 includes an interior wall of the vehicle and the through hole 42 with the hole edge 43. The temporary wire holder 50 extends from the hole edge 43 of the through hole 42. The body 41 includes a hole at the middle for a room lamp 19.

As illustrated in FIGS. 1 and 5, the through hole 42 has a rectangular shape in a plan view and a size slightly less than the first case 33 of the lighting unit 30 but greater than the second case 35 so that the second case 35 is passed therethrough. The through hole 42 is configured such that the hole edge 43 is held by the first case 33 from the interior side and with the support 13 from the exterior side. The hole edge 43 includes a rear edge section 43A on the rear side and a side edge section 43B on the left side (see FIG. 6). The temporary wire holder 50 extends from the rear edge section 43A. The side edge section 43B is located adjacent to the component-side connector 38. A left rear corner of the through hole 42 is referred to as a corner 42A.

As illustrated in FIG. 6, the body 41 and the temporary wire holder 50 are integrally formed with the body 41. The temporary wire holder 50 is a section of a material of the ceiling interior component 40 which is not cut during formation of the through hole 42. During the formation of the through hole 42, a water jet nozzle, which is a cutting device, may be moved along an outline of the through hole 42 and an outline of the temporary wire holder 50 to form the temporary wire holder 50 at the hole edge 43 of the through hole 42. It is preferable to form a space 55, which will be described later, in the process of forming the through hole 42. To form the space 55 defined by an inner edge of the temporary wire holder 50 and sections of the hole edge 43, the water jet nozzle may be moved along an outline of the space 55. The water jet nozzle may be unicursally moved to collectively form the through hole 42 and the temporary wire holder 50.

Figure 7A:
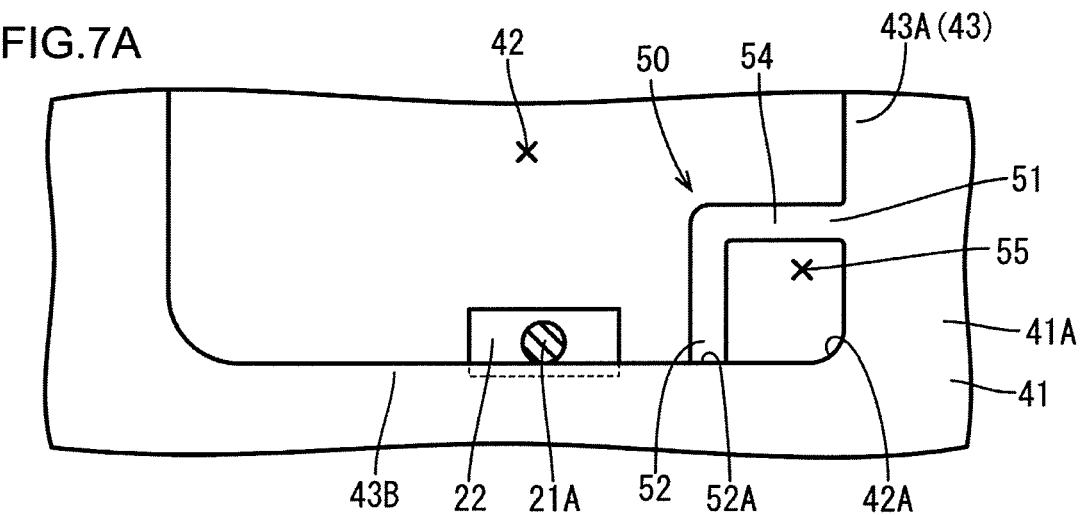
FIGS. 7A to 7C are explanatory views illustrating how to hold the electric wire by the temporary wire holder.
Figure 7B:
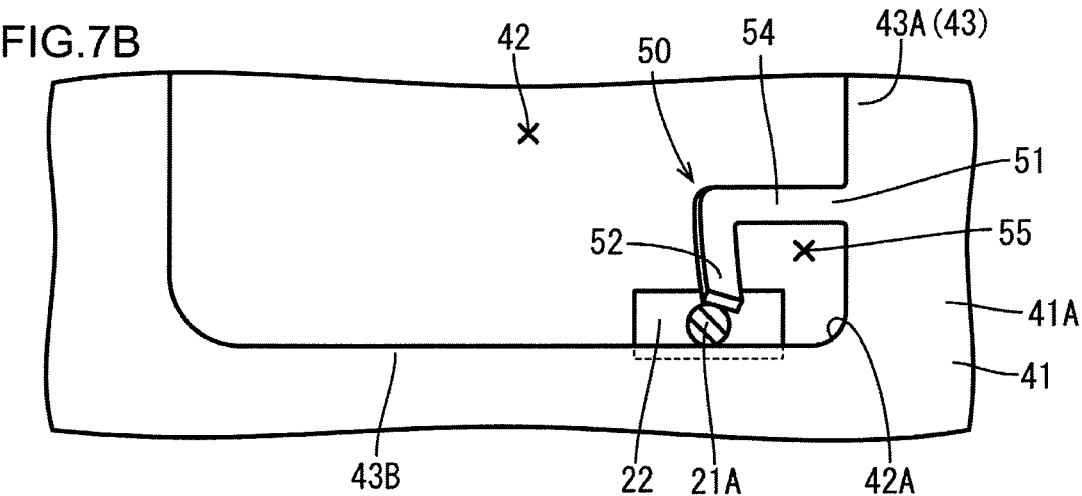
Figure 7C:
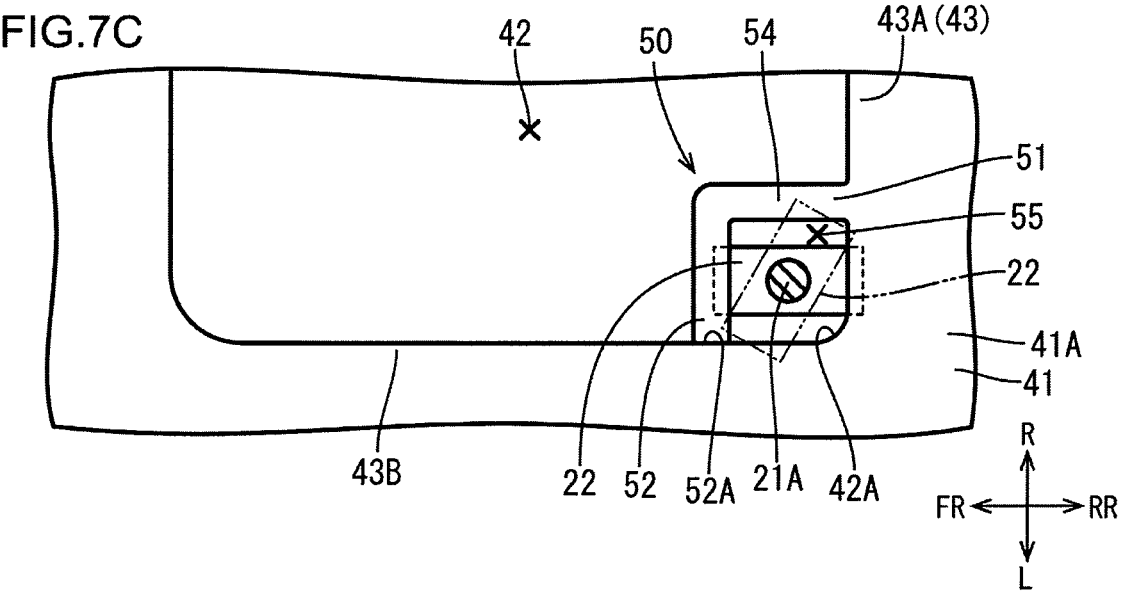

As illustrated in FIGS. 7A and 7C, the temporary wire holder 50 extends from the rear edge section 43A of the hole edge 43 toward the front side and bends toward the side edge section 43B of the hole edge 43. The temporary wire holder 50 has an L shape in the plan view. In this embodiment, the temporary wire holder 50 is located at the corner 42A that is adjacent to the component-side connector 38 when the lighting unit 30 is attached to the ceiling interior component 40. The temporary wire holder 50 is disposed not to overlap the map lamps 31 of the lighting unit 30 in the plan view (see FIG. 3).

Figure 8A:
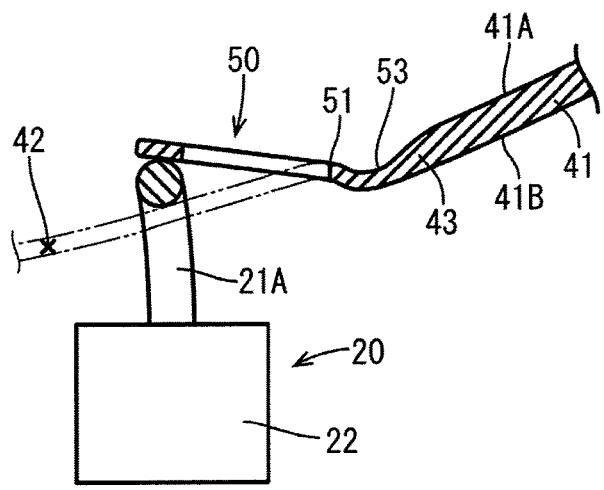
FIGS. 8A to 8C are explanatory views illustrating rotation of the temporary wire holder.
Figure 8B:
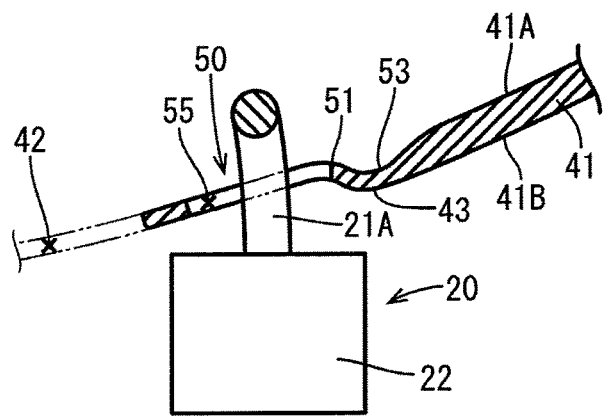
Figure 8C:
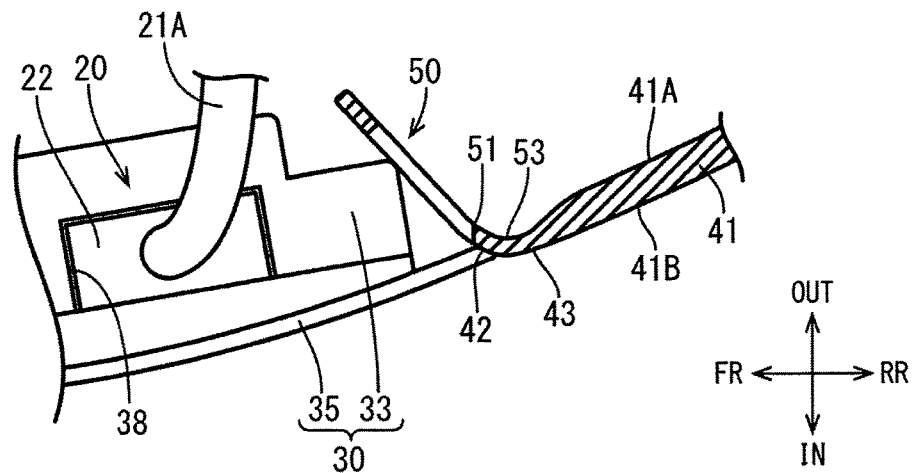

The temporary wire holder 50 includes a base section 51, a free end section 52, and a middle section 54. The base section 51 extends from the rear edge section 43A. The free end section is adjacent to the side edge section 43B. The middle section 54 is between the base section and the free end section 52. The temporary wire holder 50 is rotatable within a limited angle about a rotation axis that extends in a direction perpendicular to the front-rear direction in the plan view. As illustrated in FIGS. 8A to 8C, the base section 51 includes a groove 53 that extends along the rotation axis. The groove 53 is formed in a surface of the base section opposed to the roof panel 11 during the hot pressing of the ceiling interior component 40. The groove 53 provides the base section 51 with more flexibility in comparison to other sections of the temporary wire holder 50, that is, the base section 51 functions as an integral hinge.

As illustrated in FIGS. 7A and 7C, an end surface of the free end section 52 is slightly separated from the hole edge 43 and thus a gap 52A is formed between the end surface of the free end section 52 and the hole edge 43. The gap 52A is less than the diameter of the end section of the electric wire 21A. The temporary wire holder 50 is formed such that the free end section 52, more specifically, the end surface of the free end section 52 contacts the inner wall of the through hole 42 without the gap 52A. In this embodiment, the gap 52A is defined by the end surface of the free end section 52 and the hole edge 43 that are formed by linearly cutting the section of the material of the ceiling interior component 40 with a cutting device such as a water jet cutter.

As illustrated in FIG. 7C, the space 55 is defined by an inner edge of the base section 51, and inner edge of the free end section 52, an inner edge of the middle section 54, a part of the first section 43A connected with the inner edge of the base section 51, and a part of the second section 43B connected with the part of the first section 43A. The space has a smallest dimension that is less than a long dimension of the wire-side connector 22 in a direction perpendicular to the axis of the electric wire 21A. The long dimension of the wire-side connector 22 in a position illustrated in FIG. 7C is measured in the front-rear direction of the vehicle. The space 55 has a square shape with dimensions in the front-rear direction and the width direction of the vehicle less than the long dimension of the wire-side connector 22. The dimensions of the space 55 are defined such that the sections of the wire-side connector 22 are outside the space 55, that is, the wire-side connector 22 has the sections that are caught by the temporary wire holder 50 or the hole edge 43 of the through hole 42 even when the wire-side connector 22 is rotated about the axis of the electric wire 21A.

As illustrated in FIG. 7A, when no external force is applied to the temporary wire holder 50, that is, when the temporary wire holder 50 is in the natural state, the temporary wire holder 50 is in an original position at which the end surface of the free end section 52 is opposed to the side edge section 43B of the hole edge 43. When the external force is applied to the free end section 52, the temporary wire holder 50 rotates about the rotation axis at the base section 51 upward from the original position such that a width of the groove 53 decreases.

The temporary wire holder 50 is a holder for temporality holding the end section of the electric wire 21A during attachment of the lighting unit 30 to the ceiling interior component 40 to maintain the wire-side connector 22 at a position that allows easy access to the wire-side connector 22 for an assembly person. Specifically, the end section of the electric wire 21A is passed through the space 55 defined by the sections of the hole edge 43 and the inner edge of the temporary wire holder 50 that is in the natural state. The wire-side connector 22 is pulled out of a roof space between the roof panel 11 and the ceiling interior component 40 to the interior of the vehicle. According to the configuration, the assembly parson can easily connect the wire-side connector 22 to the component-side connector 38.

To attach the lighting unit 30 to the ceiling interior component 40, the end section of the electric wire 21A is held in the space 55 so that the wire-side connector 22 remains out of the roof space and in the interior of the vehicle as illustrated in FIG. 6 and FIG. 7C. The wire-side connector 22 is connected with the component-side connector 38 and the lighting unit 30 is inserted into the roof space via the through hole 42 from the interior of the vehicle (a second surface 41B side of the ceiling interior component 40). As the lighting unit 30 advances into the roof space, the lighting unit 30 pushes the free end section 52 to rotate the temporary wire holder 50 upward. As a result, the lighting unit 30 settles in the through hole 42. The temporary wire holder 50 has resiliency that is defined such that the temporary wire holder 50 rotates about the rotation axis at the base section 51 to expand the gap 52A to pass the end section of the electric wire 21A through the gap 52A and returns to the natural state after the end section of the electric wire 21A settles in the space 55. Next, steps of attaching the lighting unit 30 to the ceiling interior component 40 will be described in sequence.

Before mounting the ceiling interior component 40 to the roof panel 11, the wire harness 20 is routed on the first surface 41A of the body 41 (see FIG. 5). Specifically, the electric wire 21A is placed in a predefined route until the end section of the electric wire 21A reach the side edge section 43B closer to the temporary wire holder 50 while fixing the electric wire 21A to the first surface 41A at certain points. As illustrated in FIGS. 6 and 7A, the wire-side connector 22 is pulled out of the roof space from a first surface 41A side to the second surface 41B side via the through hole 42. At this stage, the end section of the electric wire 21A hangs from the side edge section 43B of the through hole 42. As illustrated in FIGS. 7B and 7C, the end section of the electric wire 21A is slid on the side edge section 43B toward the rear side of the vehicle until the end section of the electric wire 21A is inserted in the space 55. Specifically, the end section of the electric wire 21A is placed closer to the free end section 52 and slid on the side edge section 43B toward the gap 52A. The end section of the electric wire 21A is pushed against the free end section 52 until the gap 52A expands and the end section of the electric wire 21A passes through the gap 52A and reaches the space 55. When the free end section 52 is pushed, the free end section 52 may elastically deform to allow the end section of the electric wire 21A to pass through the gap 52A or the temporary wire holder 50 may rotate about the rotation axis at the base section 51 as illustrated in FIG. 8A. After the end section of the electric wire 21A is placed in the space 55, the end section of the electric wire 21A is released. The end section of the electric wire 21A remains in the space 55 as illustrated in FIGS. 7C and 8B even if the assembly person release the end section of the electric wire 21A and the wire-side connector 22 remains at the position on the interior side relative to the ceiling interior component 40 (closer to the second surface 41B than the first surface 41A).

Small electric components including a room lamp 19, that is, subassemblies are mounted to the ceiling interior component 40 while connecting them to the wire harness 20 (see FIG. 5). By mounting the subassemblies to the ceiling interior component 40 prior to the fixing of the ceiling interior component 40 to the roof panel 11, work efficiency in the fixing of the ceiling interior component 40 improves. The lighting unit 30 has a weight that may cause deformation of the ceiling interior component 40. Such a heavy component is not mounted to the ceiling interior component 40 so that the assembly person can easily handle the ceiling interior component 40, which is a large-size component.

The ceiling interior component 40 is brought closer to the roof panel 11 from the interior side of the vehicle and outer edge portions of the ceiling interior component 40 are fixed to the roof panel 11 with clips. The wire-side connector 22 at an end section of the electric wire 21A may swing during handling of the ceiling interior component 40. Because the end section of the electric wire 21A is held by the temporary wire holder 50, the end section of the electric wire 21A is less likely to move from the space 55 to the through hole 42 and thus the wire-side connector 22 is less likely to move into the roof space. When the ceiling interior component 40 is fixed to the roof panel 11, the end section of the electric wire 21A remains in the space 55 and thus the wire-side connector 22 is held at the position on the interior side relative to the ceiling interior component 40 (see FIG. 2).

After the ceiling interior component 40 is fixed to the roof panel 11, the lighting unit 30 is held closer to the through hole 42 on the second surface 41B side the wire-side connector 22 is connected with the component-side connector 38 (see two dashed chain lines in FIG. 2). The second case 35 of the lighting unit 30 is held at a predefined position and then the wire-side connector 22 is plugged into the component-side connector 38. The wire-side connector 22 plugged in the component-side connector 38 is held by the component-side connector 38 and thus less likely to move to an unexpected position. Prior to the plug-in of the wire-side connector 22 into the component-side connector 38, the end section of the electric wire 21A may be taken out of the space 55 to release the end section of the electric wire 21A from the temporary wire holder 50.

The second case 35 is inserted in the through hole 42. As the second case 35 is pushed further toward the roof panel 11, the second case 35 pushes the temporary wire holder 50 and thus the temporary wire holder 50 rotates about the rotation axis at the base section 51 toward the exterior side of the vehicle (see FIG. 8C). Because the temporary wire holder 50 is pushed out of the through hole 42 to the roof space, an area of the through hole 42 increases and thus the second case 35 can be inserted in the through hole 42 and held therein. When the second case 35 is moved to a predefined position as illustrated in FIG. 1, the mounting bases 36 contact the mounting portion 12. At the position, the second case 35 is fixed to the mounting portion 12 with the clips 15. The second case 35 is disposed in the through hole 42. The first case 33 is attached to the second case 35 to cover the hole edge 43 with the first case 33 from the interior side of the vehicle. When the hole edge 43 is covered with the first case 33, the temporary wire holder 50 that is pushed into the space between the ceiling interior component 40 and the roof panel 11 is less likely to be viewed from the interior side of the vehicle. Furthermore, the temporary wire holder 50 is held at a positon that does not overlap the map lamps 31. Therefore, the temporary wire holder 50 is less likely to be viewed through the covers of the map lamps 31. The attachment of the lighting unit 30 to the ceiling interior component 40 is complete through the steps described above.

The temporary wire holder 50 of the ceiling interior component 40 holds the end section of the electric wire 21A when the temporary wire holder 50 is in the natural state such that the wire-side connector 22 is held on the interior side of the vehicle relative to the ceiling interior component 40. Namely, the end section of the electric wire 21A can be temporarily held by the temporary wire holder 50 so that the assembly person can easily access to the wire-side connector 22 when connecting the wire-side connector 22 to the component-side connector 38. During the fixing of the ceiling interior component 40 to the roof panel 11 before the lighting unit 30 is attached to the ceiling interior component 40, the end section of the electric wire 21A and the wire-side connector 22 are less likely to be placed at unexpected positions. Therefore, the wire-side connector 22 can be easily connected with the component-side connector 38 after the ceiling interior component 40 is fixed to the roof panel 11. Furthermore, when the lighting unit 30 is inserted into the roof space via the through hole 42 from the interior side of the vehicle, the lighting unit 30 pushes the temporary wire holder 50 upward to rotate about the rotation axis so that the temporary wire holder 50 is disposed in the space between the ceiling interior component 40 and the roof panel 11 and thus the lighting unit 30 is held in the through hole 42. Namely, after the wire-side connector 22 is connected with the component-side connector 38, the temporary wire holder 50 can be rotated to be out of the way of the lighting unit 30 only by pushing the temporary wire holder 50 with the lighting unit 30 during the attachment of the lighting unit 30 to the ceiling interior component 40. Furthermore, because the temporary wire holder 50 is a portion of the ceiling interior component 40 and integrally formed with the body 41, a holding member for holding the end section of the electric wire 21A separate from the body 41 is not required. Therefore, the number of parts related to the interior components of the vehicle can be reduced.

To insert the end section of the electric wire 21A into the space defined by the temporary wire holder 50, the end section of the electric wire 21A in the through hole 42 is slid on the side edge section 43B until the end section of the electric wire 21A is placed in the space 55. To pass the end section of the electric wire 21A through the gap 52A, the end section of the electric wire 21A is pressed against the free end section 52 of the temporary wire holder 50 to cause the rotation of the temporary wire holder 50. When the temporary wire holder 50 rotates, the gap 52A expands and thus the end section of the electric wire 21A is passed through the gap 52A and placed in the space 55. After the end section of the electric wire 21A is passed through the gap 52A and place in the space 55, the free end section 52 of the temporary wire holder 50 returns to its original position and the temporary wire holder 50 returns to the natural state. Because the end section of the electric wire 21A does not pass through the gap 52A unless an external force is applied to rotate the temporary wire holder 50, the end section of the electric wire 21A remains in the space 55.

Furthermore, the smallest dimension of the space 55 is less than the long dimension of the wire-side connector 22 perpendicular to the axis of the electric wire 21A. According to the configuration, the wire-side connector 22 is caught on the temporary wire holder 50 and/or the hole edge 43 of the through hole 42. Therefore, the wire-side connector 22 is less likely to be pulled into the space between the ceiling interior component 40 and the roof panel 11. Namely, the wire-side connector 22 can be held at the proper position.

The base section 51 of the temporary wire holder 50 includes the groove 53 that is recessed in the surface of the base section 51 opposed to the roof panel 11. The groove 53 extends along the rotation axis. According to the configuration, when the external force is applied to the free end section 52 of the temporary wire holder 50, a stress concentrates on an area of the base section 51 including the groove 53 and thus the temporary wire holder 50 easily rotates in the predefined direction to the position out of the way of the lighting unit 30 for proper fixing of the lighting unit 30.

Other Embodiments

The technology described herein is not limited to the embodiment described in the above description and the drawings. The technology described herein may include the following embodiments.

(1) The technology described herein can be applied to electric devices other than the lighting unit 30 and the shape and the position of the through hole 42 can be altered from those described above to suit the electric device to be used.

(2) The shape and the position of the temporary wire holder 50 can be altered from those described above. A temporary wire holder having a U shape formed at the middle of the side edge section 43B may be included in the technical scope of the present invention. The rotation mechanism of the temporary wire holder 50 and the position of the temporary wire holder 50 after the rotation may be altered from those of the above embodiment for different ways of connection with electric component. Furthermore, a temporary wire holder linearly extending from the side edge section 43B and having an elongated shape may be included in the technical scope of the present invention. In this case, the end section of the electric wire 21A may be hooked to the temporary wire holder without rotation of the temporary wire holder; however, the temporary wire holder may rotate when the electric component is pushed into the roof space to be out of the way of the electric component.

(3) The base section 51 may not include the groove 53. The base section 51 may be configured to have a thickness less than a thickness of other sections to have more flexibility than the other sections.

(4) The method of forming the through hole 42 and the temporary wire holder 50, the material of the ceiling interior component 40, and the method of forming the ceiling interior component 40 may be altered from those of the above embodiment.

(5) The technology described herein can be applied to air conditioners, overhead consoles, and other types of electric components.

(6) The technology described herein can be applied to luggage trims, package trays, and other types of interior components of vehicles. Furthermore, the technology described herein can be applied to interior components of vehicles other than automobiles such as vessels and aircrafts.

The invention claimed is:

1. A vehicle interior component comprising:
a body including an interior wall of a vehicle and a through hole for passing an electric component including a component-side connector to fix the electric component to a vehicle panel wherein the body includes a first surface opposed to the vehicle belly panel and a second surface opposite from the first surface; and
the body also including a wire holder for temporarily holding an end section of at least one electric wire during fixing of the vehicle interior component to the vehicle panel wherein the end section of the at least one electric wire is connected with a wire-side connector, the wire holder comprising:
a base section extending from a first section of a hole edge of the through hole toward an inner side of the through hole and having resilience;
a free end section including an end surface opposed to a second section of the hole edge; and
a middle section between the base section and the free end section, wherein at least the base section, the free end section, the middle section, and the first section of the hole edge define a space having at least one dimension greater than a diameter of the end section of the electric wire and less than the wire-side connector to hold the end section of the electric wire in the space and the wire-side connector closer to the second surface than the first surface during the fixing of the vehicle interior component to the vehicle panel.

2. The vehicle interior component according to claim 1, wherein the resilience of the base section is defined such that the wire holder rotates about a rotation axis at the base section toward the vehicle panel with a force applied to the wire holder by the electric component that is pushed toward the vehicle panel.

3. The vehicle interior component according to claim 1, wherein
the first section of the hole edge and the second section of the hole edge are adjacent to each other,
the space is defined by the base section, the free end section, the middle section, the first section of the hold edge, and the second section of the hole edge,
the end surface of the free end section of the wire holder in a natural state is opposed to the second section of the hole edge with a gap less than the diameter of the end section of the electric wire, and
the free end section has resilience to deform from a natural state with a force applied to the free end section to expand the gap to pass the end section of the electric wire through the gap and to return to the natural state upon completion of passing of the end section of the electric wire through the gap.

4. The vehicle interior component according to claim 3, wherein the space has a long dimension less than a long dimension of the wire-side connector perpendicular to an axis of the electric wire.

5. The vehicle interior component according to claim 1, wherein the base section includes a recess in a surface of the base section opposed to the vehicle panel and extending along a rotation axis about which the wire holder rotates.

6. The vehicle interior component according to claim 3, wherein the resilience of the base section is greater than the resilience of the free end section.

7. The vehicle interior component according to claim 3, wherein
the first section of the hole edge and the second section of the hole edge define a corner of the through hole,
the middle section includes a curve, and
the space is defined by an inner edge of base section, an inner edge of the free end section, an inner edge of the middle section, a part of the first section of the hole edge connected with the inner edge of the base section, and a part of the second section of the hole edge connected with the part of the first section of the hole edge.

8. The vehicle interior component according to claim 3, wherein
the first section of the hole edge and the second section of the hole edge are arranged in line,
the middle section includes a curve, and
the space is defined by an inner edge of the base section, an inner edge of the free end section, an inner edge of the meddle section, a part of the first section of the hole edge connected with the inner edge of the base section, and a part of the second section of the hole edge connected with the part of the first section of the hole edge.

9. The vehicle interior component according to claim 1, wherein the body and the wire holder are integrally formed from a same material.

10. A method of installing an electric component in a vehicle, the method comprising:
routing a wire harness including an electric wire with an end section connected with a wire-side connector on a first surface of the vehicle interior component according to claim 3, wherein the first surface is opposed to a vehicle panel and a second surface of the vehicle interior component is opposite from the first surface;
passing the end section of the electric wire and the wire-side connector through the through hole from a first surface side of the vehicle interior component to a second surface side of the vehicle interior component;
placing the end section of the electric wire closer to the free end section of the wire holder of the vehicle interior component;
sliding the end section of the electric wire on the second section of the hole edge toward the gap;
pushing the end section of the electric wire against the free end section of the wire holder until the gap expands and the end section of the electric wire passes through the gap and reaches the space;
release the end section of the electric wire when the end section of the electric wire is placed in the space;
fixing the vehicle interior component to a vehicle panel;
holding the electric component closer to the through hole of the vehicle interior component on the second surface side;
connecting the wire-side connector with the component-side connector;
inserting the electric component in the through hole;
pushing the wire holder with the electric component to cause rotation of the wire holder about a rotation axis at the base section until the wire holder is out of a way of the electric component;
inserting the electric component into a space between the first surface of the vehicle interior component and the vehicle panel to a predefined position; and
fixing the electric component to the vehicle panel.

* * * * *